United States Patent
Hoxie et al.

(10) Patent No.: US 12,505,115 B2
(45) Date of Patent: Dec. 23, 2025

(54) SEARCH QUERY REFINEMENT USING GENERATED KEYWORD TRIGGERS

(71) Applicant: Elasticsearch B.V., Mountain View, CA (US)

(72) Inventors: Quinlan J. Hoxie, Lake Oswego, OR (US); David Harsha, San Francisco, CA (US); Mark Hoy, Toronto (CA); Sean Story, Nashville, TN (US); Brian Stevenson, San Francisco, CA (US); Marshall Scorcio, San Francisco, CA (US)

(73) Assignee: Elasticsearch B.V., Amsterdam (NL)

( * ) Notice: Subject to any disclaimer, the term of this patent is extended or adjusted under 35 U.S.C. 154(b) by 166 days.

(21) Appl. No.: 17/889,326

(22) Filed: Aug. 16, 2022

(65) Prior Publication Data
US 2023/0046298 A1    Feb. 16, 2023

Related U.S. Application Data

(60) Provisional application No. 63/233,622, filed on Aug. 16, 2021.

(51) Int. Cl.
*G06F 17/00* (2019.01)
*G06F 16/2457* (2019.01)
*G06F 16/2458* (2019.01)

(52) U.S. Cl.
CPC .... *G06F 16/2471* (2019.01); *G06F 16/24578* (2019.01)

(58) Field of Classification Search
CPC .......... G06F 16/2471; G06F 16/24578; G06F 16/24565; G06F 21/6227
See application file for complete search history.

(56) References Cited

U.S. PATENT DOCUMENTS

| | | | |
|---|---|---|---|
| 8,688,667 B1 * | 4/2014 | Kurzion | G06F 16/9535 706/20 |
| 9,672,277 B2 * | 6/2017 | Burns | H04L 65/40 |
| 11,397,737 B2 * | 7/2022 | Zhong | G06F 16/2428 |
| 2003/0204501 A1 | 10/2003 | Moon | |
| 2004/0199491 A1 | 10/2004 | Bhatt | |
| 2005/0102251 A1 | 5/2005 | Gillespie | |
| 2005/0262050 A1 | 11/2005 | Fagin et al. | |
| 2010/0185611 A1 * | 7/2010 | Liao | H04L 63/102 707/E17.014 |
| 2016/0308963 A1 * | 10/2016 | Kung | H04L 67/1095 |

* cited by examiner

*Primary Examiner* — Greta L Robinson (57) ABSTRACT

Provided are systems and methods for automatic search query refinement. An example method commences with identifying a plurality of electronic sources of data content of an entity stored at different network-accessible locations. The content may be dynamically assigned fields based on criteria specified by the entity. Thereupon, a unified search interface may be provided to authorized users to search the content. A search query subsequently received from a user may be parsed. The method continues with determining, upon the parsing and based on predetermined rules, triggers associated with the search query. In some embodiments, the triggers include search triggers to be used for searching content, filter triggers to be applied for filtering search results, and structural triggers to be used for ranking the search results. The method further includes searching the content based on the triggers to retrieve the search results and providing the search results to the user.

22 Claims, 6 Drawing Sheets

FIG. 1

FIG. 2 workplace search 🔍 acme inc contract created by Jane recently | Relevance ▼ | ○ Past week ▼ | My Account ▼

Clear All

All sources
Dropbox 15
SharePoint 9
Gmail 6
Slack 4
OneDrive 2
Github
Google Drive
Google Drive
Customer Record Showing Results for acme inc contract updated last week

Acme Inc – FY2020 Contractual Agreement
... contractual binding, unless stated explicitly. All trademarks, service marks and to Site ("Marks") are the property of Eslasticsearch or third parties, and you may not use the express, prior written consent of Elasticseacrch or the
https://mail.google.com/#inbox/165fd2 — 335
📧 Gmail RECEIVED on 9/21/18 at 10:25am

Acme Inc – Account 17635
📁 Dropbox /acme – 176535 — 335

DRAFT – Acme inc contract – Red Line for approval.pdf
... contractual binding, unless stated explicitly. All trademarks, service marks and to Site ("Marks") are the property of Eslasticsearch or third parties, and you may not use the express, prior written consent of Elasticseacrch or the
https://acme.dropbox.com/file/15260238060
Last updated by Emilio Murphy 3/15/20 at 10.05am

Acme Inc – Renewal Notes.pdf
... owners Emilio Murphy. A clear explanation on the nature of the contract the legal conversation, and the agreement has been sent for final approval
http://acme.dropbox.com/file.54155412434

---

📧 Gmail

Acme Inc – FY2020 Cotract...
https://mail.google.com/#inbox/165fd2

Sender
Elastic Legal & Finance Team
<legal_finance@elastic.co>

Sent at
9/21/18 at a0:25am

Recipient
ida.moen@acmeindustries.co

Excerpt
... contractually, binding, unless stated explicitly. All trademarks, service marks, and logos included on the site ("Marks") are the propert of Elasticsearch or third parties, and View on Gmail

SEARCH QUERY REFINEMENT USING GENERATED KEYWORD TRIGGERS

CROSS-REFERENCE TO RELATED APPLICATION

This application claims the priority benefit of U.S. Provisional Patent Application No. 63/233,622 filed on Aug. 16, 2021, entitled "SEARCH QUERY REFINEMENT USING GENERATED KEYWORD TRIGGERS" the contents of which are incorporated herein by reference in its entirety as if fully set forth herein.

TECHNICAL FIELD

The present technology relates generally to searching in computing environments and, more particularly, but not by limitation, to systems and methods for automatic search query refinement.

BACKGROUND

Conventional search systems typically use all words in a search query as keywords for searching data sources. If a user wants to select additional or modified parameters for the search, as is often the case, the user is generally limited to selecting specific filters or options, if available, provided via a user interface. However, conventional search systems tend to ignore contextual cues within a search query. Rather, these conventional systems are ordinarily context-agnostic and instead place most or all search terms on equal footing as prospective keywords. As a result, these conventional search features often return irrelevant, excessive, and even nonsensical results. These approaches can adversely affect the quality of the search result and can require additional computational resources to accommodate subsequent trial-and-error searches by the user, resulting in wasted time from the user's perspective.

The present disclosure addresses these and other shortcomings in the art.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In one aspect of the disclosure, a method for search query refinement is presented. The method may include identifying a plurality of electronic sources of data content of an entity stored at different network-accessible locations. Fields may be dynamically assigned to the content. A unified search interface can thereupon be to authorized users to search the content. A search query may be received from one of the users via the search interface. The search query may be parsed to identify different triggers using rules configurable by the entity for structuring the search to match a likely user intent. The triggers may be correlated with relevant ones of the fields to obtain search results.

In another aspect of the disclosure, a system for search query refinement is further presented. The system may include a memory. At least one processor may be coupled to the memory. The at least one processor may be configured to identify a plurality of electronic sources of data content of an entity stored at different network-accessible locations. The at least one processor may dynamically assign fields to the content. Thereupon, the at least one processor may provide a unified search interface to authorized user devices to search the content. A search query may be received by the at least one processor from one of the user devices via the search interface. The at least one processor may parse the search query to identify different triggers using rules configurable by the entity for structuring the search to match a likely user intent. The at least one processor may correlate the triggers with relevant ones of the fields to obtain search results.

In still another aspect of the disclosure, a non-transitory computer-readable medium is disclosed. The computer-readable medium includes code that, when executed by at least one processor, causes the processor to identify a plurality of electronic sources of data content of an entity stored at different network-accessible locations, dynamically assign fields to the content, provide a unified search interface to authorized user devices to search the content, receive a search query from one of the user devices via the search interface, parse the search query to identify different triggers using rules configurable by the entity for structuring the search to match a likely user intent, and correlate the triggers with relevant ones of the fields to obtain search results.

In various embodiments, the triggers may include search triggers to be used for searching content, filter triggers to be applied for filtering search results, and structural triggers to be used for ranking the search results. The filter triggers may include one or more of the following: a content type, a document type, a document author, a topic, and so forth. The structural triggers may include one or more of the following: a creation date, a modification date, a last opening date, a size of a document, and so forth.

Upon determining the triggers, the system may enable the user to edit one or more of the triggers. The system may further highlight words of the search query to indicate one or more of the search triggers, the filter triggers, and the structural triggers to the user. The system may also provide, via an application programming interface, an annotation associated with the search query. The annotation may indicate terms of the search query to be used as the triggers. The system may further enable the user to create one or more of the predetermined rules for determining the triggers. The predetermined rules may include one or more of the following: static rules, rules based on a schema of content indexed, rules based on values in data fields of the content, rules based on the content, and so forth.

The search engine may search the content based on the triggers to retrieve the search results and process the search results based on the triggers. The display module may display the processed search results to the user.

Additional objects, advantages, and novel features of the examples will be set forth in part in the description which follows, and in part will become apparent to those skilled in the art upon examination of the following description and the accompanying drawings, or may be learned by production or operation of the examples. The objects and advantages of the concepts may be realized and attained by means of the methodologies, instrumentalities and combinations particularly pointed out in the appended claims.

It will further be understood that other aspects of automatic search query refinement as disclosed herein will become readily apparent to those skilled in the art from the following detailed description, wherein it is shown and described only several embodiments by way of illustration.

As will be realized by those skilled in the art, the methods and systems of search query refinement are capable of other and different embodiments, and its several details are capable of modification in various other respects, all without departing from the invention. Accordingly, the drawings and detailed description are to be regarded as illustrative in nature and not as restrictive.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 3 illustrates a user interface showing an automatic search query refinement process, according to an example embodiment.

DETAILED DESCRIPTION

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The terms "exemplary" and "example" used throughout this disclosure means "serving as an example, instance, or illustration," and should not necessarily be construed as limited to the identified instance(s), nor should they be construed as preferred or advantageous over other embodiments presented in this disclosure.

Further, while the detailed description includes specific details for the purpose of providing a thorough and complete disclosure that fully conveys the scope of the invention to those skilled in the art, the principles disclosed herein may be practiced without these specific details. In some instances, well-known structures and components may be shown in block diagram form, or omitted entirely, to avoid obscuring the various concepts presented throughout this disclosure. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

As used in this application, the terms "component," "module," "system" and the like are intended to include a computer or network-related system which may include one or more physical machines, whether local or distributed remotely and accessible via one or more networks. These systems may include but are not limited to hardware, software executing on one or more machines, a combination of hardware and software, firmware, or the like. For example, a component may include, but is not limited to being, a process running on a processor, a processor, an object, an executable, a thread of execution, a program, and/or a computer. By way of illustration, both an application running on a computing device and the computing device can be a component, system, module, etc. One or more components can reside within a system, process and/or thread of execution and a component or system can be localized on one computer and/or distributed between two or more computers. In addition, these components and systems can execute from various computer-readable media having a plurality of different data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present disclosure is directed to various embodiments of systems and methods for automatic search query refinement. The system of the present disclosure may consolidate a plurality of electronic sources of data content accessible to or belonging to an entity. The system may manipulate the data content stored, or being stored on the one or more electronic sources to add fields, revise or delete existing fields, or update fields that can thereafter be used by an authorized user of the entity to run a centralized search query of all the different electronic sources from a single unified search interface, e.g., at the laptop, computer, workstation, smart phone, or other transportable or mobile device of the user, as is dependent upon the system and the controlling entity. In addition to adding, revising and manipulating fields of the data content stored, to be stored, revised or updated on the different electronic sources, the system of the present disclosure dynamically leverages the schema, values and fields associated with content in data sources to analyze search query inputs and automatically refine the underlying structure of the search query to match intent of a user that provided the search query. As an example, a system administrator may first use an initial user interface provided by the system to connect all of an organization's enterprise sources, which may include the organization's e-mail server(s), any internal/proprietary document storage system used by the organization, Google Drive, Dropbox, Microsoft One Drive, and the like. After the administrator specifies these different sources, the system described herein extracts all the content from all of these sources, and indexes the content in a manner further described below. The system may extract this information on an ongoing basis, as the organization and its employees continue to revise documents, store data, send e-mail, etc. In various embodiments, the system may then provide a single "search box" to each employee or other member of the organization, generally referred to herein as a user. The user can then enter a topic of interest in the search box. The system can thereupon search all the different enterprise sources for matching topics, and can provide the list to the server.

In various embodiments, the search queries may be highly structured. If the search query is "design documents created by Jane," in lieu of treating all terms of the search query as keywords and then searching the content for some combination of those keywords, the system can use predetermined rules to identify so-called triggers. For example, the system may use various rules to categorize the word "document" in the query. Rather than being a simple keyword to be searched for in combination with other keywords, the system can recognize that the word "document" is really intended to mean a class of search results that may include e-mails, memoranda, word processing documents, etc. The rules for establishing which terms are triggers, such as "documents" may be configured by the operator of the system. As an example, the operator may elect to include a plurality of different files having specific extensions (e.g., .doc, .pdf, etc.) as corresponding to the trigger word "documents." Rules for recognizing triggers may be dynamically specified, meaning that the system operator can change the rules for structuring data in search queries at any time.

More generally, when a user enters a search query, the system automatically parses the terms entered by the user to assess the search structure. Instead of treating all terms as keywords, the system automatically parses the search query and extracts terms from the word search that it determines are structural to the query. The system automatically builds a structured search in the background. The system also factors out of the keyword portion of the search terms that are determined to be structural. The example word "document" can be treated as one such trigger and can be removed from the other terms that are determined to be treated as keywords. In the structured query built by the system in the background, the word "document" is the filter trigger that can be used to refer to the various relevant file formats as described above. In addition, the term "created by Jane" can be used as a filter trigger to filter only those documents whose author is Jane. As another example, if the search is "recent documents created by Jane," the system when parsing the query may use the predetermined rules to identify "recent" as not a keyword, but rather a sorting structural trigger that is used to place a temporal limitation on the search. For example, in various embodiments, the system may remove the word "recent" from the other keyword text, and then automatically sort the search results to include the newest documents first. In short, the system described herein can automatically create a structured search, which in turn can greatly simplify searches by users across many different sources at once.

Among other benefits, the system of the present disclosure allows end users to type a natural language search query into a search box and then translates the natural language search query into a structured query based at least in part on predetermined rules dynamically provided by the entity, an agent thereof, or in appropriate contexts, a user (e.g., an employee of the entity). The rules can be dynamically provided, as noted, in that they can be changed by a user to change the way the system parses queries. In addition, the searches themselves can be also performed dynamically in that the search engine can adapt automatically based on the content stored in the system. The schema of the content in the system helps the system determine the different fields that can be parsed out of a query during the structuring of the query by the system. That is to say, the system provides two modes of functionality. The first mode is when the system is inputting content from one or more sources and making that content "searchable." This procedure can include updating content periodically over time, or updating the content on the fly as it is revised, or as new content is input into the system. The second mode is the end-user performing the actual search. The new content that is being extracted from the different electronic sources has a schema. A schema is a representation in the form of an outline. For example, an e-mail has informational attributes like a subject, an author, a recipient, ccs and bccs, a body, one or more attachments, etc. All of these fields represent the schema of the document, which are ultimately populated into fields. To make the system dynamic during this initial mode, as new documents continue to come into the electronic sources, the system may automatically search these documents to determine their schema—namely, what additional fields those documents may include. Whatever such schema is identified can be used by the system to automatically change the way queries are parsed. Thus, for example, during the second mode when a user is entering a search query "e-mails with attachments," the system will have already established the schema of e-mail in the first mode. Thus when structuring the search, the system may use "e-mails" and "attachments" as triggers and may then proceed to search for all actual e-mails that have a non-empty attachment field, flag, etc. This simple example of automatically identifying the schema of an e-mail by identifying its fields and later using this information to parse search queries can be extended to more complex documents and data structures. The system can automatically create fields for such documents, so that when a search is subsequently run, the system can use the schema (e.g., the outline of fields) to correlate the triggers with the fields.

As another example, certain cloud-based networks have a sharing function. The sharing function is part of the schema of documents sourced from that cloud source. When content from that source is first downloaded, the system can automatically identify documents that are being shared. The system can thus automatically create the schema of the document to include a "shared" field. The system may also automatically create other related fields, such as the name of the individual sharing the document. When a search query is subsequently performed, the parsing of the query can be modified, for example, when the search query states "all documents shared by Mike." The search can be structured to identify all documents that have a sharing function and that is currently enabled, and that includes "Mike" as the sharer of the documents. The dynamic nature of this automatic schema-building is yet another benefit of the flexibility of the centralized search system according to some embodiments.

In various configurations, the principles herein can be employed in the context of a single person, or an organization. For purposes of this disclosure, the term "entity" shall broadly refer to any organization, such as a corporation or governmental entity, or other community of users of any kind that may acquire and/or use the systems and methods for search refinement as described herein. The entity may include different users. The entity may provide one or more criteria or rules used for adding and revising fields, or for manipulating triggers at the search stage. For purposes of this disclosure, the entity providing this information is equivalent to an agent of the entity, such as an employee, an authorized information technology (IT) technician or an authorized third-party contractor providing the information. The principles herein may be realized as a utility, or suite thereof, that an entity may use to consolidate features it uses regularly for searches of a database, whether the database is local, networked such as in network attached storage (NAS) or a storage area network (SAN), or otherwise as stored or distributed in one or more cloud-based sites, e-mail servers, or similar devices, used and maintained by a third party, the corporation or other entity, users of the entity, or some combination thereof. Further, for purposes of this disclosure "a network" may in appropriate circumstances refer to a plurality of networks that may be mutually accessible. Thus, for example, the different electronic sources may reside on different networks, while being accessible to network users (e.g., employees, executives, partners or other members) of the entity.

The system for query refinement described herein may, for example, be used for effecting this consolidation of features that in turn can be made available to one or more individual users, or one or more users within the organization or other entity to conduct effective search queries. The consolidation of the individual features described herein is beneficial in that among other attributes, a user seeking to execute a query for information no longer has to individually search among the different features to identify the desired results. Likewise, the user is no longer relegated to long waits while prolonged, unstructured keyword searches are generically processed against large sets of distributed databases only for the user to receive long lists of potentially irrelevant search results. Instead, by using triggers that help structure the query to match the actual search intent, the system is more likely to narrow the search in a relevant way and provide more direct and relevant results in a single search.

Instead, in an embodiment, a single, unified search dialog box on a graphical user interface, or a combination of linked input entries on the unified user interface may be used to broadly conduct a search across a plurality of disparate electronic sources. Examples of such electronic sources include e-mail servers (e.g., Gmail), various cloud network locations (Google, iCloud, Microsoft's OneDrive, and the like), a database internal to the company that includes proprietary content, an e-mail server, and other network locations or URLs, e.g., that may include information about the entity's customers. The electronic sources may be networked, whether via a local area network (LAN), wide area network (WAN), metropolitan area network (MAN), the Internet, a virtual private network (VPN), or a network configuration of any type. In some cases, the data store that includes the search results may be in a centralized location, in which case a network is not necessarily needed for connection to all searchable electronic sources of data content, but only remote sources.

Using a single machine on the network, such as a networked personal computer, laptop computer, notebook computer, tablet, mobile device, etc., the user may enter a topic once, and the utility may conduct a search across all consolidated electronic sources for any search results relevant to the topic input as the search query, as described in more detail herein. For example, the system can process the data content in the plurality of specified electronic sources on an ongoing basis. The system can start by indexing the data as it is stored, and as it continues to be updated, revised, and populated with new data over time. This indexing may include adding, updating, revising, and deleting fields, and creating new fields that may include not only typical fields such as dates and numbers, but also fields that corresponds to the content of the data itself. For example, using criteria from the entity, random names and proper nouns can be inserted into newly created fields. These fields can later be used for keyword searches based on search triggers identified in search queries. Ultimately, the electronic sources are made available to authorized users of the entity as a unified search interface, which may in some embodiments include a single dialog box on a user interface of a networked computer.

During the ongoing indexing and manipulation of fields of these different electronic sources, the users can conduct search queries using these tools. In various embodiments, the search query can be analyzed by dissecting the search query to determine triggers in the search query. For example, the keyword "documents" in the search query can be determined to be a filter trigger that is applied to the search results to match the user's intent. When the filter trigger is found, any record that is a document (e.g., PDF, docx, Google Document) needs to be filtered into search results. Next, the keywords "created by Jane" in the search query may be determined to be a filter trigger. When the filter trigger is found, any document that was created by a person with the first name Jane is filtered into search results. While the two concepts may overlap depending on the context, a filter trigger generally refers to a word or phrase that can be used to exclude otherwise responsive documents from scope of the search, whereas a structural trigger may be used for ranking or sorting the search results. For example, "documents" may be a filter trigger in that any items that do not fall within the scope of a "document" as per the established rules provided by or to the system may be filtered out of the search. Examples of filter triggers may include one or more of the following: a content type, a document type, a document author, a topic, and so forth. The structural triggers may include one or more of the following: a creation date, a modification date, a last opening date, a size of a document, and so forth. For structural triggers, for example, larger documents may come up earlier in the search results, while smaller documents come up later. Depending on the predetermined rules, structural triggers may also be considered a filter trigger when documents of a specific size are relevant, and other document sizes are excluded.

In the predetermined rules, the keywords "created by" may be associated with a created action. Documents stored in the data sources may have fields that are associated with the created action (e.g., a field storing a name of a person that created the document). Therefore, when the system determines that the search query includes the "created by Jane" keywords, the system can search for any content that was created by any user named "Jane" in an organization. The structured nature of the search query enables the system to properly correlate the filter and structural triggers with the appropriate fields in a manner that is most relevant to the intended search of the user.

Then, the keyword "design" in the search query may be designated as a keyword for searching the content. During the initial indexing of the data content by the system, the content of the data itself can be used as one of the fields for matching a keyword. When the keyword is found, any documents created by any user named "Jane" and having the keyword "design" are included in the search results. Therefore, the ultimate structured search query is to search for documents of any types that have the term "design" in the title or the document content and that were created by a user named "Jane."

The predetermined rules specified by the entity and used by the system to identify relevant triggers and contextual cues may include one or more of the following: static rules, rules based on a schema of content indexed, rules based on values in data fields of the content, rules based on the content, and so forth. The rules for identifying triggers are dynamic in that they are changeable in real-time. In addition, as noted above, the rules may originate from the content stored in the data sources. Specifically, the rules can be dynamically changed based on the type of content added to the data sources, configurable criteria used in the indexing of the content and specified by the entity using the system (or by the system itself), files recently accessed by users, additional data sources added, new users joining an organization, and so forth. For example, if there is content that is filtered down by departments or topics that a team in the organization is working on, the rules for filtering the content can be updated in real time to respond to the search query efficiently, based on the content being added to the system. Therefore, as the organization is creating more content around different topics with different structures, all of the content from the topics is fed to a search engine of the system automatically and the search queries are handled properly based on the evolution of the content and topics in the organization. Further refinement of the added content can be specified by the entity or user of the system via different configurable criteria.

The rules for processing the search queries may be based on the schema of the content that comes into the data sources. New fields can be added, and existing fields can be modified, based on rules in the system that can be dynamically modified by criteria available to the entity using the system, including an agent or employee thereof. As the content is continually indexed from the plurality of different electronic sources identified by the system, all of this content can be provided to authorized users on the network via a unified search engine. In some embodiments, a single search interface can be used for entering natural language queries. When the system receives queries via the search interface of one of the users, the query can be structured using triggers to identify the intent of the search. The content parameters may include fields of documents, values of the fields, a structure of the documents, and so forth. As noted, for example, if a document is created by Jane, the field "created by" is a person-related field. The date of creation of the document may be a date-related field.

In an example embodiment, the processing of the search query performed by the system may include disambiguation between dates and names. For example, keywords "created on" may be determined to relate to date-related fields, and keywords "created by" may be determined to relate to person-related fields. In the person-related fields, values of the fields may be identifiers for a person.

If the user wants to customize or fine tune the rules, the user can create different contextual words and designate these words as triggers. For example, the user can set a qualifying term. That is, for instance, the term "on" after an action can be qualified as a date-related field, and the term "by" after an action be qualified as a person-related field. Moreover, the user can set a rule such that if an action is followed by "by," the system needs to search for people-related fields, but not date-related fields in the content. Furthermore, the user can set specific keywords to determine the context of a specific language.

In an example embodiment, the user may be allowed to create custom block lists. The block lists are lists of words that should never be considered trigger words (e.g., "it," "in," "pages," "string," and so forth). In some cases, the system can provide some false positives. For example, some structure of the content that gets indexed can introduce new rules to a search model, which may result in the search model behaving in a way not needed by the user. To customize the search model, the user can affirmatively configure the search engine to not consider specific terms or not consider specific terms in a particular way.

In an example embodiment, the system allows static definition of rules. These rules are directly specified by the user and include what the user does not want to be learned from the content. For example, the user may request a search for "images created by me." The keyword "images" may result in a search for images of all possible image formats that are created by this user and stored in the indexed content. Because this rule is static, this rule is not driven by the content.

The problem solved by the system is translating a search query represented in human language (e.g., "design documents created by Jane") into a meaningful structured query including one or more triggers that can be used to attempt to most closely match the search intent where the triggers are correlated with fields created during the storage of data content in different electronic sources. To solve the problem, the data content across a plurality of specified electronic sources is initially analyzed and dissected when it is first stored. Based on these analyses and rules predetermined by the operator or organization, also referenced as the entity, the system can dynamically create a plurality of relevant fields. The search engine of the system provides users with a unified interface to conduct searches for data content across the plurality of electronic sources. The system analyzes a user-input search query, automatically dissects the search query, and applies refinements to the search query to match user intent determined based on the analysis of the search query. The search rules provided by the search engine are dynamic in part because they are configurable based on the data in the data sources and can also be configured directly by the operator of the system or entity. The schema of records and values of fields in the data sources are initially used to build the rules for searching and processing (e.g., filtering, ranking) the search results. Using this procedure, the system can expediently obtain a set of documents from the varied data content that is more relevant in a faster time than in the conventional case where the search terms are mere keywords for comparison with a vast body of generic text.

In an example embodiment, the system can build a set of rules dynamically as content from the data sources when the content is ingested in the search engine. Every time a search query is input by a user, the text of the search query is analyzed to determine the intent of the user. The output of this analysis is multipart. Specifically, the system decides whether search results should be filtered (e.g., "created by Jane" can become a filter trigger for fields that denote creation personas using the name "Jane"). The system further determines which terms are actual text queries and not structural (e.g., "design"). The system further determines which terms are structural triggers, such that terms that denote structural intent (such as "most recent") become a "sort trigger" to sort the search results by "creation date" based on the "most recent" terms used in the search query.

In some embodiments, the rules may include determining the trigger "most recent" as a sorting directive. Therefore, the search results may be sorted by showing the most recent content first.

In an example embodiment, when the system responds to the user with the search results, the system may highlight or annotate the ultimate search query to indicate, to the user, how the search query was analyzed by the system. Specifically, when the user types in words in a search box, the system may highlight words determined by the system as the triggers. Therefore, if the words triggered a refinement in the search query, the words are highlighted, and the user is able to see how the search query was processed in the structured search query. In some embodiments, the system may provide, via an application programming interface, an annotation to the search query to indicate terms of the search query used as the triggers. This enables a developer to tune a custom user interface to reflect how the system processed the search query. The system may further change the user interface to look as though the user selected specific filters that were found in the search query by the system. The changes made to the user interface act as a feedback loop provided to the user via the application programming interface and in the user interface to show how the system analyzes the search query.

Thus, the system can use dynamic rules based on content, special concepts for classes of fields and terms identifying people, custom context triggers, custom block lists for false positives, and user interface elements to provide user feedback on the analysis of the search query. The system also provides developer application programming interfaces to enable automatic refinements to the search query. Therefore, the system not only processes the search query, but also provides feedback to the user to show how the search query was processed by the system. The user can in turn modify the search or a trigger to change how the search query is parsed by the system or to match the intent of the search more closely.

Thus, advantages provided by the system include creating rules for searching and processing the search results that dynamically inherit rule structure from the content in the data sources. The system also covers key usability concerns from real-world scenarios, such as the ability to configure required contextual terms, static rules, and disallowing false positive terms.

Figure 1:
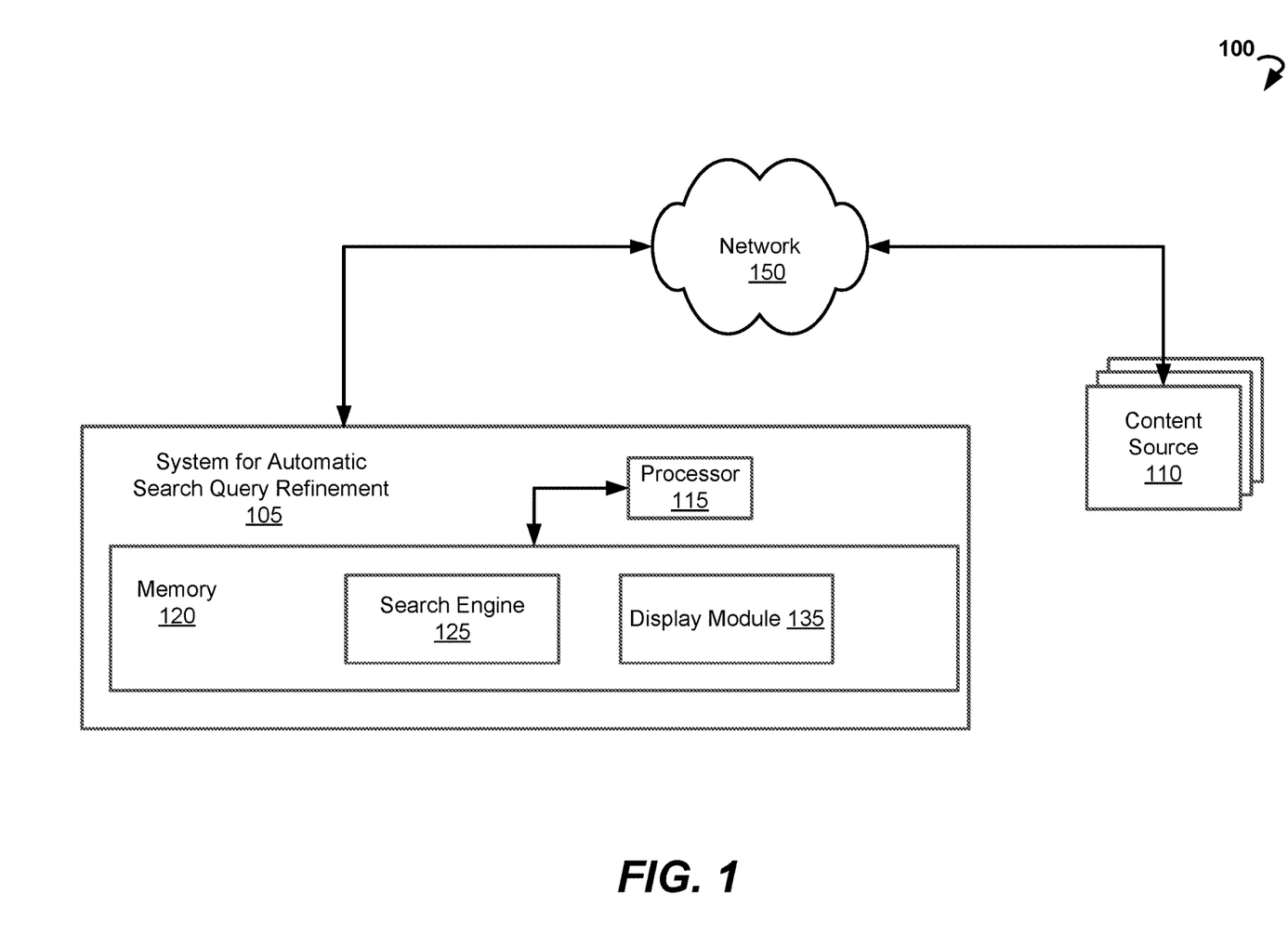
FIG. 1 is a high-level schematic diagram of a computing architecture for practicing aspects of the present technology, according to example embodiments.

Referring now to the drawings, FIG. 1 is a high-level schematic diagram of an exemplary computing architecture (hereinafter referred to as architecture 100) of a computing environment of the present technology. The architecture 100 includes an exemplary system for automatic search query refinement shown as a system 105. In some embodiments, the system 105 includes a server or cloud-based computing device configured specifically to perform the analysis described herein. That is, the system 105, in some embodiments, is a specific purpose computing device that is specifically designed and programmed (e.g., configured or adapted) to perform any of the methods described herein. The system 105 can also include a plurality of distributed computing systems that cooperatively provide the features of the system 105. For example, individual ones of the plurality of distributed computing systems can provide one or more unique functions or services. In some embodiments, the system 105 can comprise a cloud computing environment or other similar networked computing system.

The system 105 can be communicatively coupled, via a network 150, with one or more content sources 110. A content source 110 can include, for example, a computing system, an enterprise network, a plurality of computing systems arranged as a network, virtual machines, application(s), databases, network tap(s), services, a cloud, containers, or other similar computing environment that creates data instances. In an example embodiment, the system 105 includes a processor 115 and memory 120 for storing instructions. The processor 115 may be implemented as one or more general purpose processors, reduced instruction set computer (RISC) processors, or dedicated processors. The latter category may include, for example, one or more digital signal processors (DSPs), field programmable gate arrays (FPGAs), digital logic gates, or any combination thereof. The instructions and steps of the methods described in this disclosure may be implemented or executed by the one or more processors 410 (FIG. 4) or related devices. The processor 115 may reside on a single device. In other configurations, the processor 115 may include two or more processing devices or central processing units (CPUs) distributed across a plurality of devices.

For purposes of this disclosure, the term "electronic source" can broadly include any number of recognizable data sources including, without limitation, local folders, local or network hard drives, solid-state drives or any physical configuration that is accessible locally or via a network. Thus "electronic sources" may include cloud-based network locations controlled by the operator, organization or other entity, e-mail servers, folders, and any number of private or public applications that are accessible to the operator or organization and includable as a source that can be searched for documents and other data content.

The memory 120 can include a search engine 125 and a display module 135. As used herein, the terms "module" may also refer to an application-specific integrated circuit ("ASIC"), an electronic circuit, a processor (shared, dedicated, or group) that executes one or more software or firmware programs, a combinational logic circuit, and/or other suitable components that provide the described functionality.

In an embodiment, when the system 105 is initially installed, a system operator or other agent of the entity using the system 105 may designate a plurality of different electronic sources for searching data content. As the content sources are periodically populated and updated, information may be extracted from the content in or near real time to identify, update, and create new fields. The fields can be manipulated by the organization dynamically using rules or preferences identified by the system from an application, and application programming interface, or otherwise by an IT specialist at the organization or entity, for example.

The content source 110 may include different electronic sources of data content as described above. They may include different folders, subfolders or other organization-controlled applications that reside on one or more local or remote computing devices. While FIG. 1 shows the content source 110 as being available through the network 150, in some embodiments the content source 110 can be local to the system 105. For purposes of this disclosure, content is construed to mean any kind of electronic data content, including but not limited to documents, writings, images, illustrations, recordings, audio works, videos, e-mails, communications, memoranda and files, data or electronic information of any kind. The content may be input for temporary or permanent storage into one or more potentially disparate content sources, such as an e-mail server and a cloud-based network, for example.

When the files are initially stored, they may be dissected and assigned various fields. For example, an e-mail file may include an author field, a recipient field, cc and bcc fields, time and date fields, and the like. Documents such as memoranda may have date fields, subject fields, size fields (e.g., number of pages), body content, the number and type of attachments, etc. Each kind of data content may include one or more different fields.

In one aspect of the disclosure, the system 105 and corresponding search engine 125 are dynamically configurable. For example, as new documents are stored in one of the content sources 110, that content may contain fields that presently do not exist. Accordingly, the system 105 may automatically create new fields to facilitate subsequent searches of the content. For example, when e-mail files are initially stored with an attachment having a specific file format, a field identifying an e-mail having an attachment with the identified format may be created. Depending on the predetermined rules and the identified needs of the organization, any number of different field types can be recognized. This field-based information may be specified by an operator of the system 105, such as via an application programming interface, or via another technique. Other types of more common fields may also be automatically recognized and created. One such field type may be the content source itself (e.g., Google Drive or another cloud-based location maintained by the relevant organization). Another exemplary field may be the name of an individual.

Thus, as new documents are being populated into different ones of the content sources 110, different fields can be dynamically assigned to new or different information sources. These fields can be subsequently used as triggers in subsequent search queries. An individual search query written in natural language, for example, can be dissected and the different triggers can be associated with different terms in the search in order to structure the search and facilitate the identification of the most relevant results. In short, the system 105 can assign new fields to incoming content designated for a content source 110.

In addition, as noted, the actual content of the stored documents can itself be identified as a field and used as part of the structure of a subsequent search query. For example, names (Elizabeth, John, etc.) that are present in stored documents can be identified to correspond with a name field. The system 105 may receive a search query from a user. Upon receiving the search query, the search engine 125 may parse the search query. Upon parsing, the search engine 125 may determine, based on predetermined rules, triggers associated with the search query.

The triggers may include search triggers to be used for searching content. The search triggers may include keywords identified in the search query. The triggers may further include filter triggers. The filter triggers may be applied to filter search results. The filter triggers may include one or more of the following: a content type, a document type, a document author, a topic, and so forth.

The triggers may further include structural triggers. The structural triggers may be used for ranking the search results. The structural triggers may include one or more of the following: a creation date, a modification date, a last opening date, a size of a document, and so forth.

Based on the triggers, the search engine 125 may search the content to retrieve the search results. Upon finding the search results, the search engine 125 may process the search results based on the triggers. The display module 135 may display the processed search results to the user.

In an example embodiment, upon determining the triggers, the search engine 125 may enable the user to edit one or more of the triggers. The system 105 may highlight words of the search query to indicate the keywords, the filter triggers, and/or the structural triggers to the user.

In a further example embodiment, search engine 125 may enable the user to create one or more of the predetermined rules for determining the triggers to tailor search experience to their needs.

As noted, while the search may be initiated as a natural language search in some embodiments, system 105 can use the search engine 125 to access a plurality of consolidated features including content source(s) 110. The system 105 can be configured to identify context in a natural language search and run it internally using processor 115 as a highly structured query. Rather than treating the search as a plurality of keywords and looking for a combination of the keywords across the content source 110 as is performed conventionally, the system 105 may instead be configured to ascertain context based on the search input. For example, when a user types in "pdfs that refer to the Gemini project," the system 105 can use the triggers and predetermined rules described above to determine that the intent of the search in this context is not to treat "pdfs" as a keyword, but rather that the term refers to a document type. Thus in lieu of searching for combinations of the above grouping that include the term "pdfs" the system 105 may instead understand that the search context in this example may be much narrower. Thus, for example, the system 105 may search across the local and remote content sources for all documents in .pdf form.

As another example, during a search query a user may enter into the search engine 125 "Gruvhausen patent documents." Here again, in lieu of using documents as a keyword to be found in combination with the other search terms in the content source 10, the system 105 may be preconfigured to contextualize the search and determine that "documents" is similar to the above example of "pdfs," and just at one level of abstraction. Accordingly, rather than run a simple keyword search, the system 105 may instead refer to the predetermined rules and conclude that document explicitly encompasses a narrower definition. Guided by the relevant trigger, the system 105 can then search for all e-mails, memoranda, and other types of sources that can reasonably be referred to as "documents" that relate to the "Gruvhausen patent," which itself may be partitioned into a keyword "Gruvhausen" and another trigger ("patent") as further described herein.

In various embodiments, an operator of the system 105 (e.g., the organization) can also dynamically establish rules that attempt to ferret out false positives, such as information that commonly leads to search errors due to the diversity of language. As one example, if the organization is an accounting firm named Smith & Jones, it may be undesirable in certain circumstances to assign a name field to "Smith." In other embodiments, the user can specify rules for disregarding the use of a particular false positive. This flexibility for ferreting out false positives can render the search engine 125 highly robust and efficient.

Figure 2:
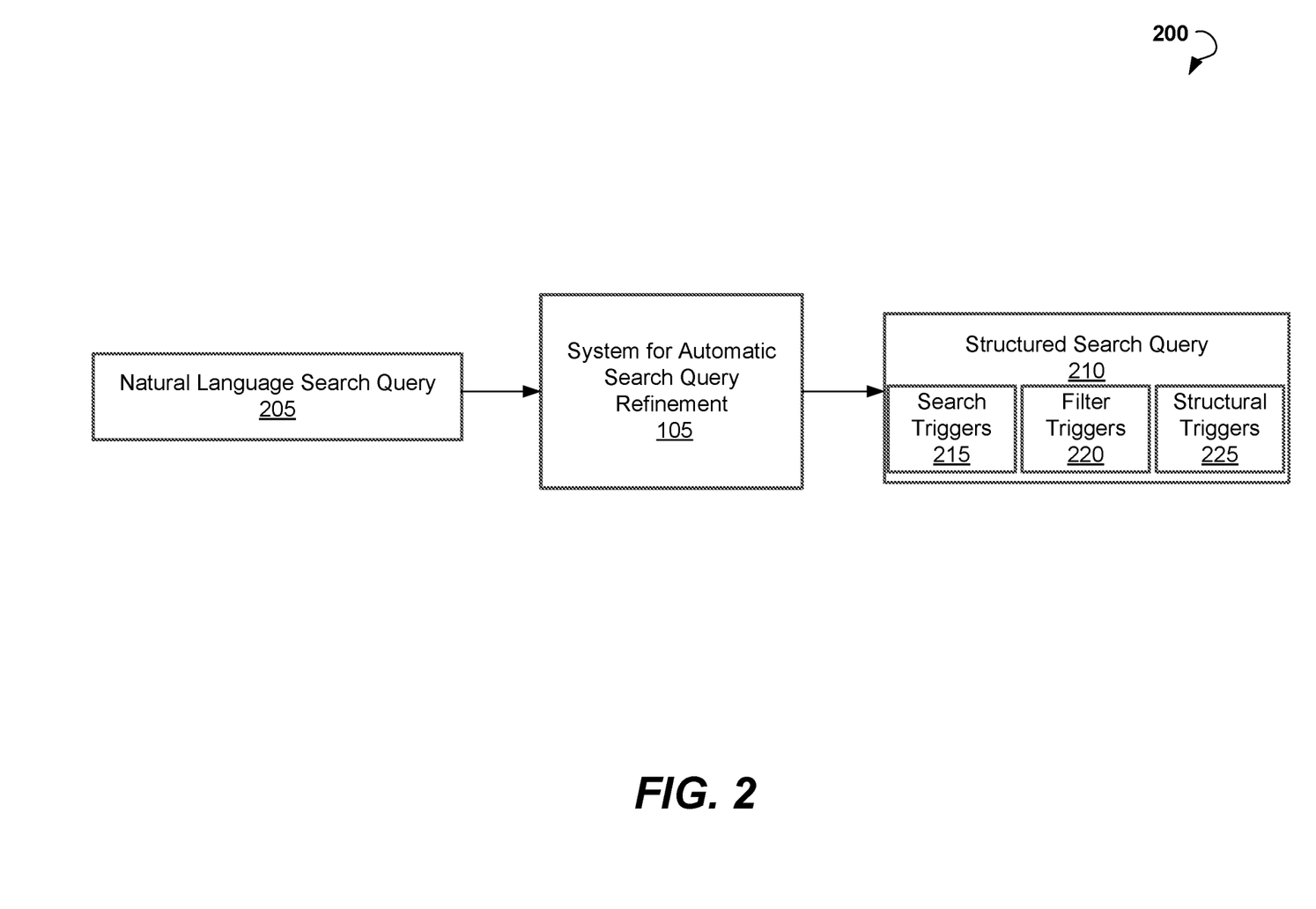
FIG. 2 is a schematic diagram showing automatic search query refinement by a system for automatic search query refinement, according to an example embodiment.

FIG. 2 is a schematic diagram 200 showing automatic search query refinement by the system 105, according to an example embodiment. A user provides a natural language search query 205 to the system 105. An example natural language search query 205 may include "acme inc contract created recently by Jane."

The system 105 receives the natural language search query 205 and processes the natural language search query 205 into a structured search query 210. The processing may include determining, in the natural language search query 205, search triggers shown 215, filter triggers 220, and structural triggers 225.

The search triggers 215 are then used by the system 105 as words searched in the content. The filter triggers 220 are applied by the system 105 to filter search results found based on the keyword search. The structural triggers 225 are used by the system 105 for ranking the filtered search results.

FIG. 3 illustrates a user interface 300 showing an automatic search query refinement, according to an example embodiment. A user enters a natural language search query 305 via a user interface of the system 105. An example natural language search query 305 may include "acme inc contract created by Jane recently."

The system 105 receives the natural language search query 305 and processes the natural language search query 305 into a structured search query. The processing includes determining, in the natural language search query 305, search triggers 310, filter triggers 315, 320, and 325, and structural triggers 330. Specifically, the system 105 may determine, based on predetermined and configurable rules, that the keywords "acme inc" are search triggers 310 to be searched in the content data sources. The system 105 may further determine that the keyword "contract" is the filter trigger 315. Based on the filter trigger 315, the system 105 may filter search results found based on the keyword search to select only documents that are contracts.

Thereafter, system 105 may further determine that the keywords "created by" and "Jane" are the person-related filter triggers 320 and 325, respectively. Based on the filter triggers 320 and 325, the system 105 may filter the previously selected contracts to select only contracts created by a user named "Jane." Then, system 105 may further determine that the keyword "recently" is a date-related filter trigger. Based on the date-related filter trigger, the system 105 may filter the previously selected contracts created by a user named "Jane" to select only documents that were created within the predetermined term, for example, within the week or any predetermined number of days before the current date. Furthermore, the keyword "recently" may be also designated as a structural trigger 330. Based on the structural trigger 330, the system 105 can sort the search results to show the most recent search results first. The filtered and sorted search results 335 may be presented to the user on the user interface 300.

In an example embodiment, the system 105 may change the user interface 300 based on the trigger filters identified in the natural language search query 305. In conventional search systems, to select a date range for filtering the search results, the user typically needs to use a dropdown menu and select the date range, for example, "past week." The system 105 can automatically change the user interface 300 based on the trigger filters. Specifically, upon determining that the natural language search query 305 includes the keyword "recently," which is the date-related filter trigger, the system may automatically select the "past week" option in a dropdown menu 340. Therefore, the user needs to enter the natural language search query 305 in a search box 350 instead of manually selecting options from any of the dropdown menus of the user interface 300. Upon receiving the natural language search query 305, the system 105 may automatically select the options in the dropdown menus of the user interface 300 based on the triggers identified by the system 105 in the natural language search query 305. Changing the user interface 300 may serve as a feedback loop provided via the application programming interface and in the user interface 300 to the user to show the user how the system 105 processed the natural language search query 305.

Figure 4:
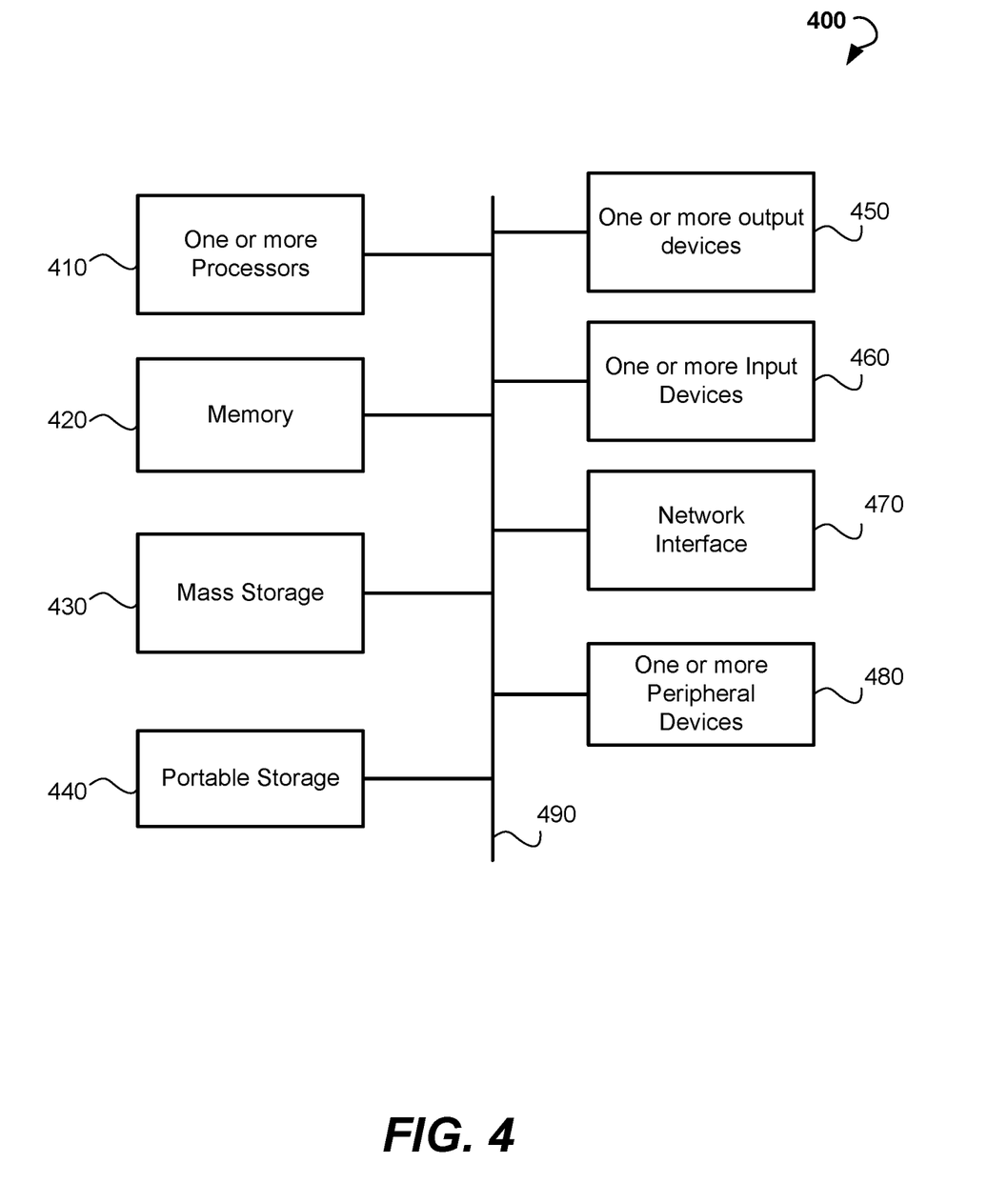
FIG. 4 is a schematic diagram of a computing system that is used to implement embodiments according to the present technology.

FIG. 4 illustrates an exemplary computing system 400 that can be used to implement embodiments described herein. The computing system 400 can be implemented in the contexts of the system 105. The exemplary computing system 400 of FIG. 4 may include one or more processors 410 and memory 420. Memory 420 may store, in part, instructions and data for execution by the one or more processors 410. Memory 420 can store the executable code when the exemplary computing system 400 is in operation. The exemplary computing system 400 of FIG. 4 may further include a mass storage 430, portable storage 440, one or more output devices 450, one or more input devices 460, a network interface 470, and one or more peripheral devices 480.

In various embodiments, the instructions herein can be executed on the one or more processors and can be stored on memory 420 in the form of one or more application programming interfaces, application software, and other routines and provided, at least in part, on the portable storage device 440.

The components shown in FIG. 4 are depicted as being connected via a single bus 490. The components may be connected through one or more data transport means. The one or more processors 410 and memory 420 may be connected via a local microprocessor bus, and the mass storage 430, one or more peripheral devices 480, portable storage 440, and network interface 470 may be connected via one or more input/output buses.

Mass storage 430, which may be implemented with a magnetic disk drive or an optical disk drive, is a non-volatile storage device for storing data and instructions for use by a magnetic disk or an optical disk drive, which in turn may be used by one or more processors 410. Mass storage 430 can store the system software for implementing embodiments described herein for purposes of loading that software into memory 420.

Portable storage 440 may operate in conjunction with a portable non-volatile storage medium, such as a compact disk (CD) or digital video disc (DVD), to input and output data and code to and from the computing system 400 of FIG. 4. The system software for implementing embodiments described herein may be stored on such a portable medium and input to the computing system 400 via the portable storage 440.

One or more input devices 460 provide a portion of a user interface. The one or more input devices 460 may include an alphanumeric keypad, such as a keyboard, for inputting alphanumeric and other information, or a pointing device, such as a mouse, a trackball, a stylus, or cursor direction keys. Additionally, the computing system 400 as shown in FIG. 4 includes one or more output devices 450. Suitable one or more output devices 450 include speakers, printers, network interfaces, and monitors.

Network interface 470 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 470 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 480 may include any type of computer support device to add additional functionality to the computing system. The one or more peripheral devices 480 may include a modem or a router.

The components contained in the exemplary computing system 400 of FIG. 4 are those typically found in computing systems that may be suitable for use with embodiments described herein and are intended to represent a broad category of such computer components that are well known in the art. Thus, the exemplary computing system 400 of FIG. 4 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, systems and methods for automatic search query refinement are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

Figure 5:
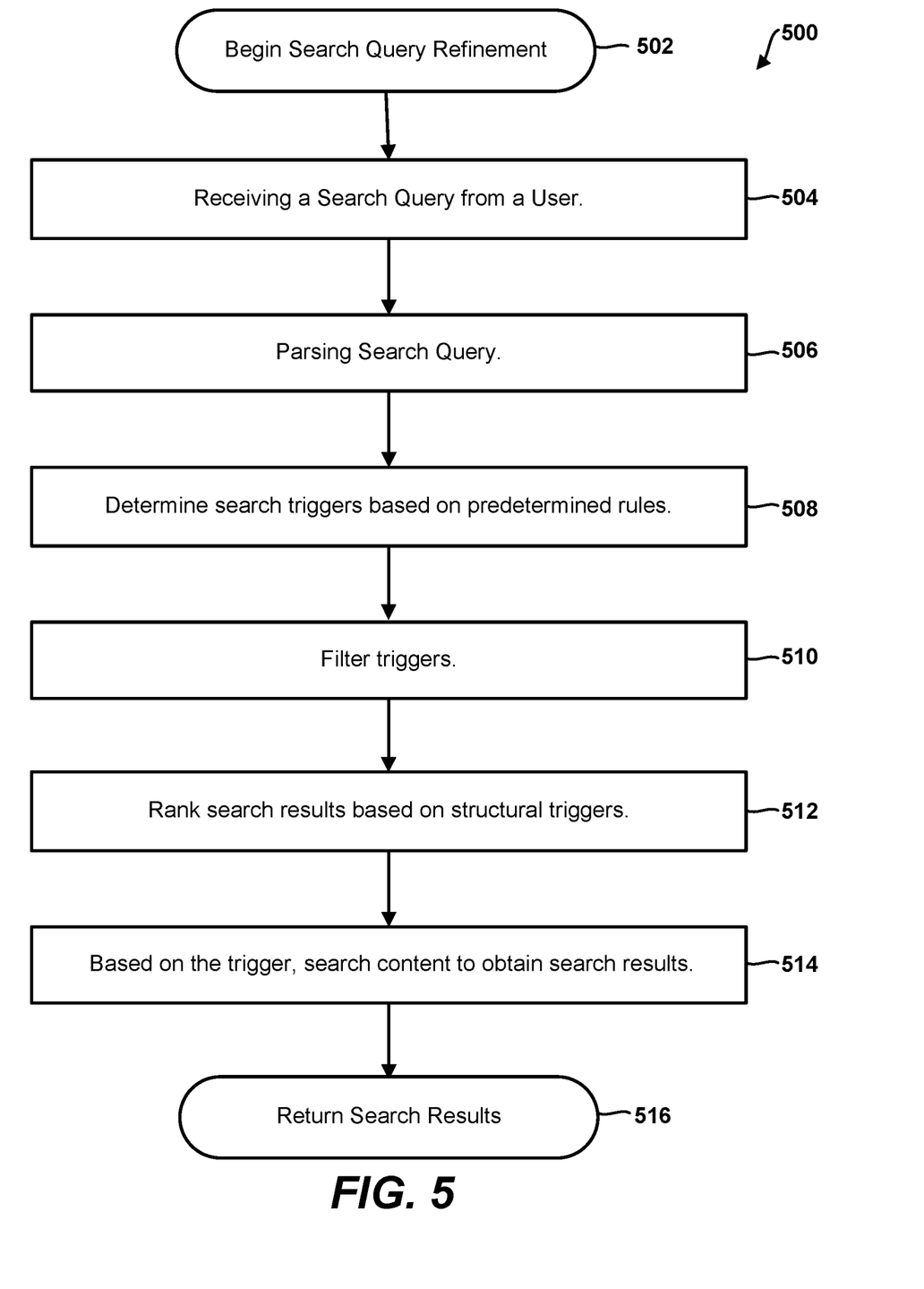
FIG. 5 is an example flow diagram of an automatic search query refinement process, in accordance with an embodiment.

FIG. 5 is an example flow diagram 500 of an automatic search query refinement process, in accordance with an embodiment. The steps identified in FIG. 5 may be performed by the system 105 (FIG. 1), including processor 115, search engine 125 and memory 120; the steps may also be performed by Natural Language Search Query component 205 along with system 105 and structured search query component 210 (FIG. 2); the steps may still further be performed by the one or more processors 410 and the various other devices shown in FIG. 4.

Referring to step 502, the search query refinement commences by the system 105. At 506, the search query received by a user at step 504 via the search interface ((e.g., shown by display module 135 (FIG. 1)) and one or more input devices 460 (FIG. 4) is parsed. Upon the parsing of the search query terms, the system at step 508 may determine one or more search triggers based on predetermined and configurable rules. The search triggers may, for example, correspond to content identified in new or custom fields created by the system when indexing the data content in the various electronic sources 110 (FIG. 1). In addition, at step 510, one or more filter triggers may be identified as described above. The system may use the filter triggers for filtering the search results identified in step 508, for example, by correlating the filter triggers to the search results and/or to the fields identified in the search results. The search terms are returned at step 516.

Thereupon, at step 512 one or more structural filters may be identified. The system may rank or sort the heretofore identified data content using one of more of the structural triggers as described in greater detail above. For example, the system may correlate the structural triggers with similar fields that have indexed information in the contents of the data content in the different electronic sources 110. At 514, based on all the triggers, the system can obtain and sift through relevant search content in one or more intermediate steps, if necessary, to obtain the final search results for display, e.g., on display module 135.

Figure 6:
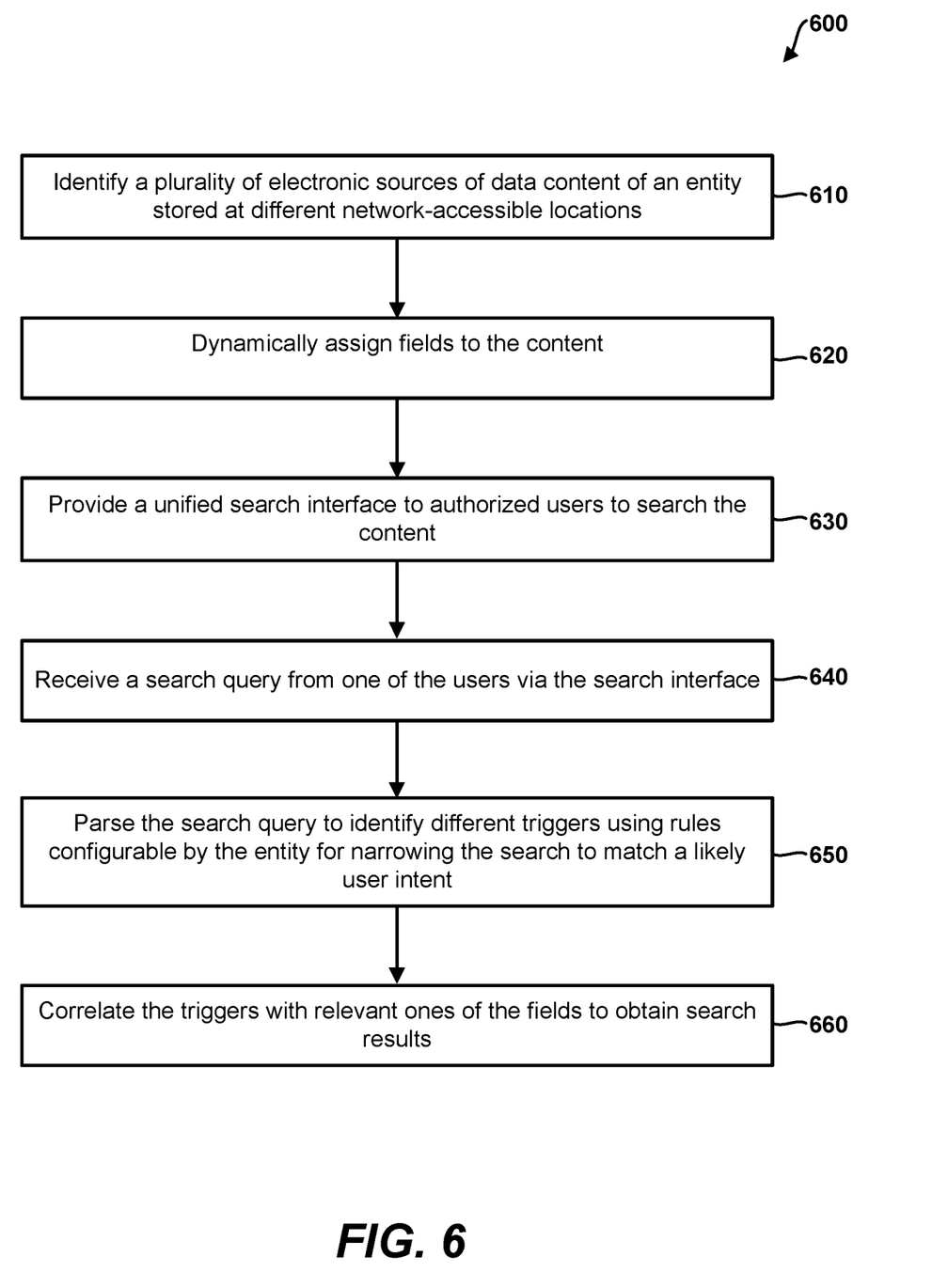
FIG. 6 is another example flow diagram of an automatic search query refinement process, in accordance with an embodiment.

FIG. 6 is another example flow diagram 600 of an automatic search query refinement process, in accordance with an embodiment. The steps in FIG. 6 may be performed by the devices identified above with reference to FIG. 5, for example. At step 610, the system may use information from the entity to identify a plurality of different electronic sources of data content of the entity stored at different network-accessible locations. Thereupon, at step 620, the system may proceed to index the content by dynamically assigning fields to the content based at least in part on criteria specified by the entity, which for purposes of this disclosure includes an agent, contractor, employee, or group of personnel authorized to provide this information on behalf of the entity. In various embodiments, the assignment and addition of fields is a systematic undertaking by the system as the data content is continuously indexed as new files and other content are revised, updated, or stored over time on any of the different electronic sources. At 630, the system may provide a unified search interface to a plurality of authorized users to search the content.

At step 640, the system may receive a search query from one of the authorized users (e.g., an employee, agent, contractor, or otherwise authorized personnel) via the search interface (e.g., systems 105, natural language search query component 205, display 125, or devices 460, 470, etc.). In some embodiments, the search interface may be presented in natural language. At step 650, the system may parse the search query to identify different triggers using rules configurable by the entity for narrowing the search to match a likely user intent. Having identified the search triggers, the system at step 660 can thereupon correlate the triggers with relevant ones of the fields to obtain the search results 660.

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for analyzing a search query comprising:
   providing at least one processor and a memory coupled to the processor, the memory configured to store instructions executable by the at least one processor;
   identifying a plurality of electronic sources of data content of an entity stored at different network-accessible locations with the at least one processor;
   dynamically assigning fields to the data content;
   providing a unified search interface to authorized users for searching the content;
   receiving the search query from one of the authorized users via the unified search interface;
   parsing the search query to identify one or more triggers in real time for structuring the search to establish a user intent; and
   correlating the triggers with relevant ones of the fields to obtain search results relevant to the user intent.

2. The method of claim 1, wherein the triggers comprise a search trigger, the search trigger comprising at least one keyword for searching the data content.

3. The method of claim 1, wherein the triggers comprise a filter trigger used for filtering the searched data content.

4. The method of claim 1, wherein the triggers comprise a structural trigger used for ranking the search results.

5. The method of claim 4, wherein the structural trigger includes one or more of a creation date, a modification date, a last opening date, or a document size.

6. The method of claim 1, further comprising updating one or more of the fields in the content or assigning new fields when new or revised content is added for storage.

7. The method of claim 1, wherein parsing the search query is performed using rules configurable by the entity.

8. The method of claim 7, further comprising modifying the rules based on a schema of a document added as part of the content.

9. The method of claim 7, wherein the rules include one or more of static rules, rules based on a schema of content indexed, rules based on values in data fields of the content, rules based on the content, or rules for blocking false positives.

10. The method of claim 1, further comprising, upon determining the triggers in the search query, enabling the user to edit one or more of the triggers.

11. The method of claim 1, further comprising providing, via an application programming interface, an annotation associated with the search query, the annotation indicating terms of the search query to be used as the triggers.

12. A system for analyzing a search query, comprising:
    a memory;
    at least one processor coupled to the memory and configured to:
       identify a plurality of electronic sources of data content of an entity stored at different network-accessible locations;
       dynamically assign fields to the data content;
       provide a unified search interface to authorized user devices to search the data content; receive the search query from one of the authorized user devices via the search interface; parse the search query to identify one or more triggers in real time for structuring the search to establish a user intent; and
       correlate the triggers with relevant ones of the fields to obtain search results relevant to the user intent.

13. The system of claim 12, wherein the triggers comprise one or more of: a search trigger to be used for searching content;
    a filter trigger to be used for filtering search results;
    a structural trigger to be used for ranking the search results.

14. The system of claim 13, wherein the filter triggers include one or more of the following: a content type, a document type, a document author, and a topic.

15. The system of claim 13, wherein the structural triggers include one or more of the following: a creation date, a modification date, a last opening date, and a size of a document.

16. The system of claim 13, wherein the at least one processor is further configured to highlight words of the search query to indicate the one or more search triggers, the filter triggers, and the structural triggers to the user.

17. The system of claim 12, wherein the at least one processor is further configured, upon determining the triggers, to enable the user to edit one or more of the triggers.

18. The system of claim 12, wherein the at least one processor is further configured to parse the search query using rules configurable by the entity.

19. The system, of claim 18, wherein the rules include one or more of static rules, rules based on a schema of content indexed, rules based on values in data fields of the content, rules based on the content, or rules for blocking false positives.

20. The system of claim 12, wherein the at least one processor is further configured to provide, via an application programming interface, an annotation associated with the search query, the annotation indicating terms of the search query to be used as the triggers.

21. A non-transitory computer-readable medium, comprising code to analyze a search query that when executed by one or more processors causes the one or more processors to:

identify a plurality of electronic sources of data content of an entity stored at different network-accessible locations;

dynamically assign fields to the data content;

provide a unified search interface to authorized user devices to search the data content;

receive a search query from one of the authorized user devices via the search interface;

parse the search query to identify one or more triggers in real time for structuring the search to match a user intent; and correlate the triggers with relevant ones of the fields to obtain search results relevant to the user intent.

22. The computer-readable medium of claim 21, wherein the at least one processor is configured to parse the search query using rules configurable by the entity.

* * * * *